(12) United States Patent
Kojima

(10) Patent No.: US 10,180,192 B2
(45) Date of Patent: Jan. 15, 2019

(54) RELIEF VALVE

(71) Applicant: PACIFIC INDUSTRIAL CO., LTD., Ogaki-shi, Gifu-ken (JP)

(72) Inventor: Keisuke Kojima, Ichinomiya (JP)

(73) Assignee: PACIFIC INDUSTRIAL CO., LTD., Ogaki-shi (JP)

( * ) Notice: Subject to any disclaimer, the term of this patent is extended or adjusted under 35 U.S.C. 154(b) by 28 days.

(21) Appl. No.: 15/512,415

(22) PCT Filed: Jun. 19, 2015

(86) PCT No.: PCT/JP2015/067708
§ 371 (c)(1),
(2) Date: Mar. 17, 2017

(87) PCT Pub. No.: WO2016/088396
PCT Pub. Date: Jun. 9, 2016

(65) Prior Publication Data
US 2017/0284552 A1    Oct. 5, 2017

(30) Foreign Application Priority Data

Dec. 4, 2014 (JP) .................................. 2014-245487

(51) Int. Cl.
*F16K 17/04* (2006.01)
*F16K 17/02* (2006.01)
(Continued)

(52) U.S. Cl.
CPC ................ *F16K 17/02* (2013.01); *F16K 5/08* (2013.01); *F16K 17/04* (2013.01);
(Continued)

(58) Field of Classification Search
CPC ........ F16K 17/04; F16K 27/12; F16K 15/028; F16K 15/063; Y10T 137/7043
See application file for complete search history.

(56) References Cited

U.S. PATENT DOCUMENTS 5,913,664 A    6/1999  Shimizu et al.

FOREIGN PATENT DOCUMENTS

| CN | 2816531 Y | 9/2006 |
|----|-----------|--------|
| EP | 0784173 A2 | 7/1997 |

(Continued)

OTHER PUBLICATIONS

Sep. 8, 2015 Search Report issued in International Patent Application No. PCT/JP2015/067708.
(Continued)

*Primary Examiner* — Reinaldo Sanchez-Medina
*Assistant Examiner* — Nicole Gardner
(74) *Attorney, Agent, or Firm* — Oliff PLC

(57) ABSTRACT

Provide is a relief valve in which the flexibility of an attaching position is higher than a conventional relief valve. In the relief valve of the present invention, a discharge hole for discharging a fluid is arranged on a side surface of a cylindrical portion which protrudes from an end surface of a head portion in a bolt-type valve body. A direction change member which changes a direction in which the discharge hole is open to an arbitrary direction is provided. In this way, the relief valve is attached to a fluid device, and then with the direction change member, it is possible to direct the fluid discharge direction to a desired direction, and accordingly, the flexibility of the attaching position of the relief valve is enhanced as compared with the conventional relief valve.

5 Claims, 9 Drawing Sheets

(51) Int. Cl.
*F16K 5/08* (2006.01)
*F16K 27/12* (2006.01)
*F16K 15/14* (2006.01)

(52) U.S. Cl.
CPC .......... *F16K 17/0413* (2013.01); *F16K 27/12* (2013.01); *F16K 15/148* (2013.01)

(56) References Cited

FOREIGN PATENT DOCUMENTS

| EP | 1813846 A2 | 8/2007 |
| EP | 2505885 A2 | 10/2012 |
| JP | H03-46077 U | 4/1991 |
| JP | H05-38415 U | 5/1993 |
| JP | H11-125348 A | 5/1999 |
| JP | 2011-043094 A | 3/2011 |
| JP | 2014-043866 A | 3/2014 |

OTHER PUBLICATIONS

Sep. 8, 2015 Written Opinion issued in International Patent Application No. PCT/JP2015/087708.
Sep. 13, 2017 Office Action issued in Japanese Patent Application No. 2014-245487.
Sep. 6, 2017 Search Report issued in European Patent Application 15865147.
Dec. 19, 2017 Office Action issued in Japanese Patent Application No. 2014-245487.
May 10, 2018 Office Action issued in Korean Patent Application No. 10-2017-7007083.
Jul. 2, 2018 Office Action issued in Chinese Patent Application No. 201580050637.4.

RELIEF VALVE

TECHNICAL FIELD

The present invention relates to a relief valve which opens, when a fluid pressure that is applied through a valve hole to a valve member is higher than a reference pressure, and discharges a fluid from a discharge hole.

BACKGROUND ART

Conventionally, as this type of relief valve, a relief valve is known in which a valve member and an elastic member are accommodated in a hollow room formed in a center portion of a bolt-type valve body and in which a valve hole is provided in a tip end surface and a discharge hole is provided in a base end surface. When this relief valve is attached to, for example, a car air conditioner, and the pressure of a fluid (specifically, a coolant) is abnormally increased, the valve hole is opened, and thus part of the fluid is discharged from the discharge hole to the outside (see, for example, patent document 1).

RELATED ART DOCUMENTS

Patent Documents

Patent document 1: Japanese Unexamined Patent Application Publication No. H11-125348 (paragraphs [0003], and [0006], and FIG. 3)

SUMMARY OF THE INVENTION

Problems to be Solved by the Invention

A relief valve needs to be arranged in such a manner that a discharged fluid is prevented from being applied to a component which becomes degraded by receiving the fluid. Further, in order to prevent, the driver from feeling uneasy, the relief valve attached to the car air conditioner needs to be arranged such that the fluid is discharged to an inconspicuous place. However, since the fluid discharge direction is directed to the axial direction of a valve body in the conventional relief valve described above, the flexibility of an attaching position is disadvantageously lowered in order to satisfy the necessary conditions described above.

The present invention is made in view of the foregoing circumstances, and has an object to provide a relief valve in which the flexibility of an attaching position is higher than the conventional relief valve.

Means of Solving the Problem

In order to achieve the above object, a relief valve according to the present invention is characterized in that it includes a bolt-type valve body, a hollow room which is formed in a center portion of the bolt-type valve body and which includes a component insertion port that is open to an end surface of a head portion of the bolt-type valve body, a lid member which closes the component insertion port, a valve hole which is open to a tip end surface of the bolt-type valve body and which communicates with the hollow room, a valve member which is accommodated in the hollow room and which opens and closes the valve hole, an elastic member which is accommodated in the hollow room and which biases the valve member to a side where the valve hole is closed, a cylindrical portion which is formed in the lid member and which protrudes from the end surface of the head portion, a discharge hole which is formed in a side surface of the cylindrical portion, and a direction change member which is rotatingly operated and which changes a direction in which the discharge hole is open to an arbitrary direction.

(deleted)
(deleted)
(deleted)
(deleted)
(deleted)
(deleted)
(deleted)
(deleted)
(deleted)
(deleted)
(deleted)

MODE FOR CARRYING OUT THE INVENTION

First Embodiment

Figure 1:
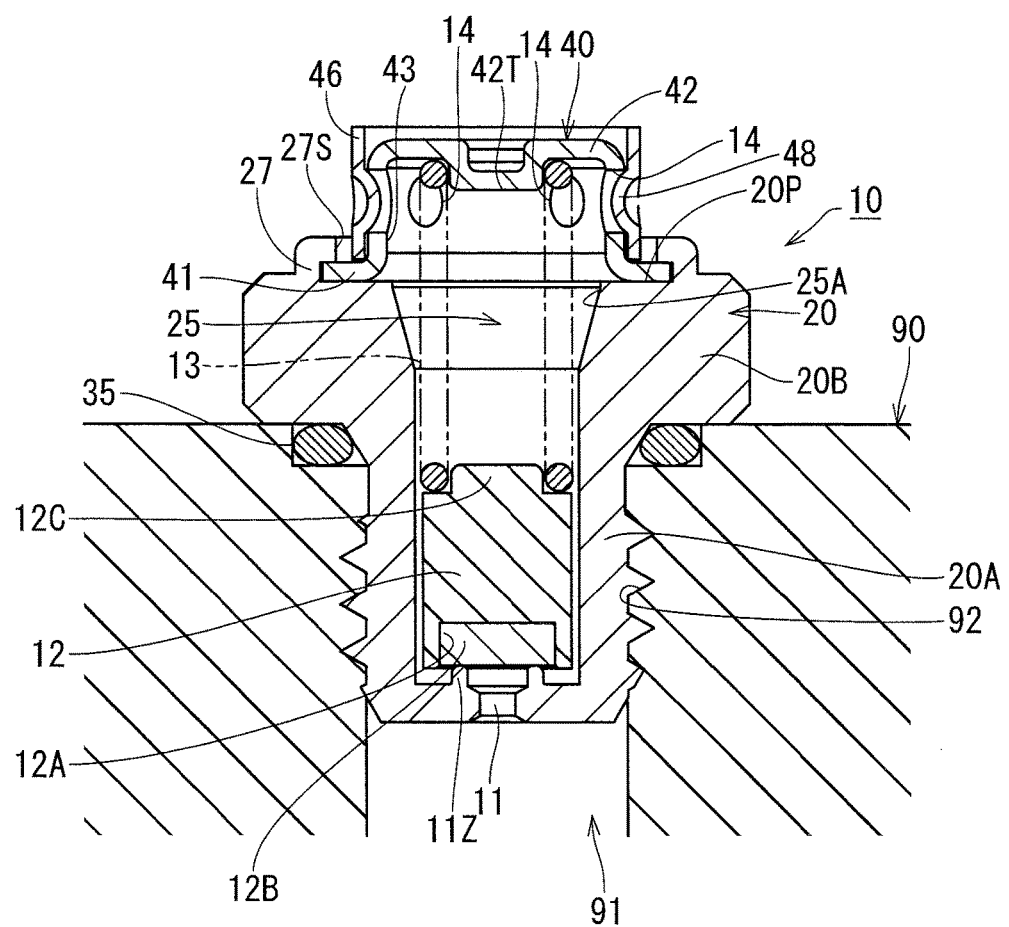
FIG. 1 is a front cross-sectional view of a relief valve according to a first embodiment of the present invention.

The first embodiment of the present invention will be described below with reference to FIGS. 1 to 5. As shown in FIG. 1, the relief valve 10 of the present embodiment includes, in the base end portion of a male screw portion 20A, a bolt-type valve body 20 (hereinafter simply referred to as a "valve body 20") which has a head portion 20B that is hexagonal shape in a plane. In the center portion of the valve body 20, a hollow room 25 is formed. In an end surface 20P of the head portion 20B, one end portion of the hollow room 25 is opened as a component insertion port 25A. Between the center portion of the innermost surface of the hollow room 25 and the tip end surface of the valve body 20, a valve hole 11 is formed and penetrated. A cylindrical valve seat 11Z protrudes from an opening edge of the valve hole 11 in the innermost surface of the hollow room 25.

Inside the hollow room 25, a valve member 12 is accommodated linearly movably. The valve member 12 is in a columnar shape as a whole, has a recessed portion 12A in one end surface and has an elastomer seal member 12B in the recessed portion 12A. The seal member 12B comes into contact with the valve seat 11Z and closes the valve hole 11. A center protruding portion 12C whose diameter is smaller than that of the entire valve member 12 protrudes from the other end surface of the valve member 12. A compression coil spring 13 which is an "elastic member" of the present invention is accommodated in the hollow room 25 with its lower end portion fitted in the outer side of the center protruding portion 12C.

In order to retain the valve member 12 and the compression coil spring 13 in the hollow room 25, a lid member 40 is attached to the end surface 20P of the head portion 20B. The lid member 40 is, for example, a press-molded product of metal sheet and has a cylindrical portion 43 (which corresponds to a "cylindrical portion" according to the present invention) whose upper end is closed by a ceiling wall 42 and whose lower end is opened, and a contacting flange 41 is extended laterally from the lower end of the cylindrical portion 43. In a position close to the outer edge of the end surface 20P of the head portion 20B, an annular protruding wall 27 concentric with the hollow room 25 protrudes so as to correspond to the lid member 40. In a state where the contacting flange 41 overlaps the inner side portion than the annular protruding wall 27 on the end surface 20P, the annular protruding wall 27 is swaged such that the annular protruding wall 27 is tilted inward, and accordingly, the lid member 40 is fixed unrotatably with respect to the valve body 20. In this way, the hollow room 25 is extended inward of the lid member 40, and the upper end portion of the above-mentioned compression coil spring 13 is in a stretched state between the ceiling wall 42 of the lid member 40 and the valve member 12. On the inner surface of the ceiling wall 42, a center protruding portion 42T which corresponds to the center protruding portion 12C of the valve member 12 is formed, and the upper end portion of the compression coil spring 13 is fitted in the outer side of the center protruding portion 42T.

Figure 2:
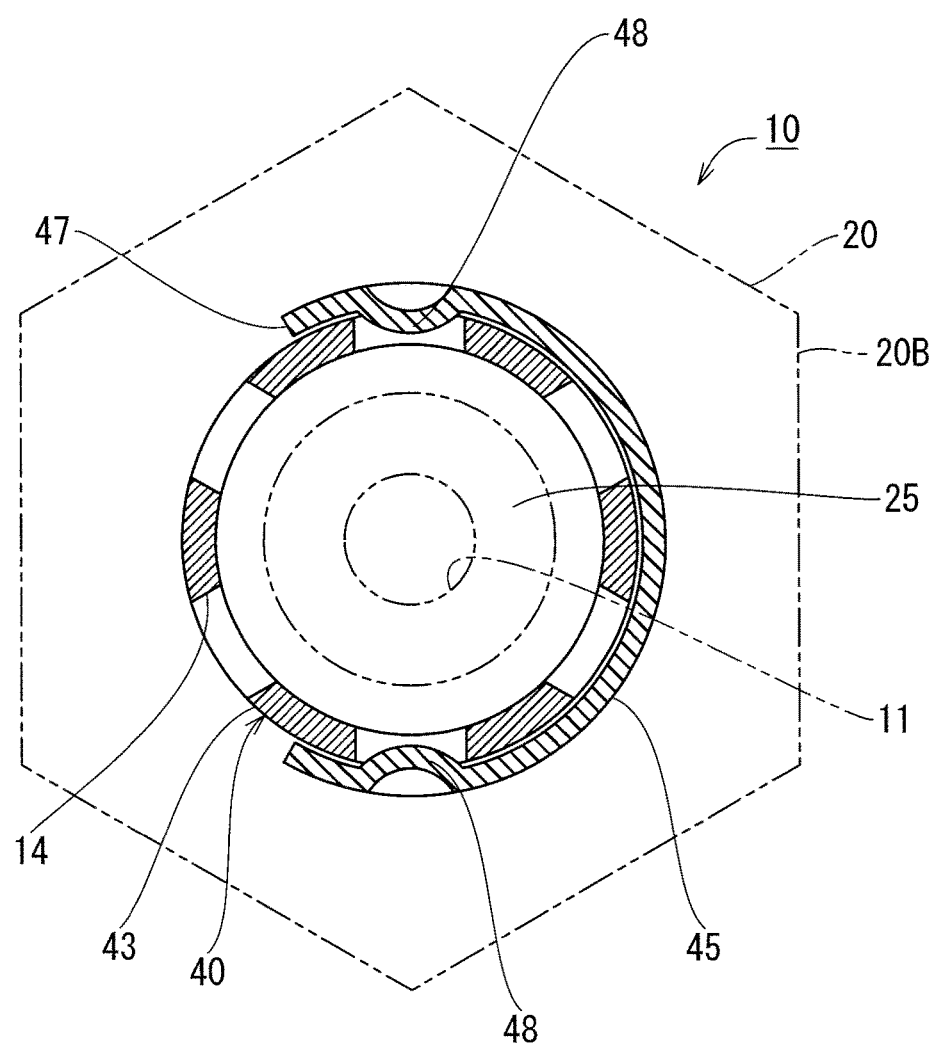
FIG. 2 is a plan cross-sectional view of a cover member and a lid member.

As shown in FIG. 2, in the cylindrical portion 43, discharge holes 14 are formed in six positions which are equally spaced in the circumferential direction. Each of the discharge holes 14 is substantially in a circular shape.

Figure 3:
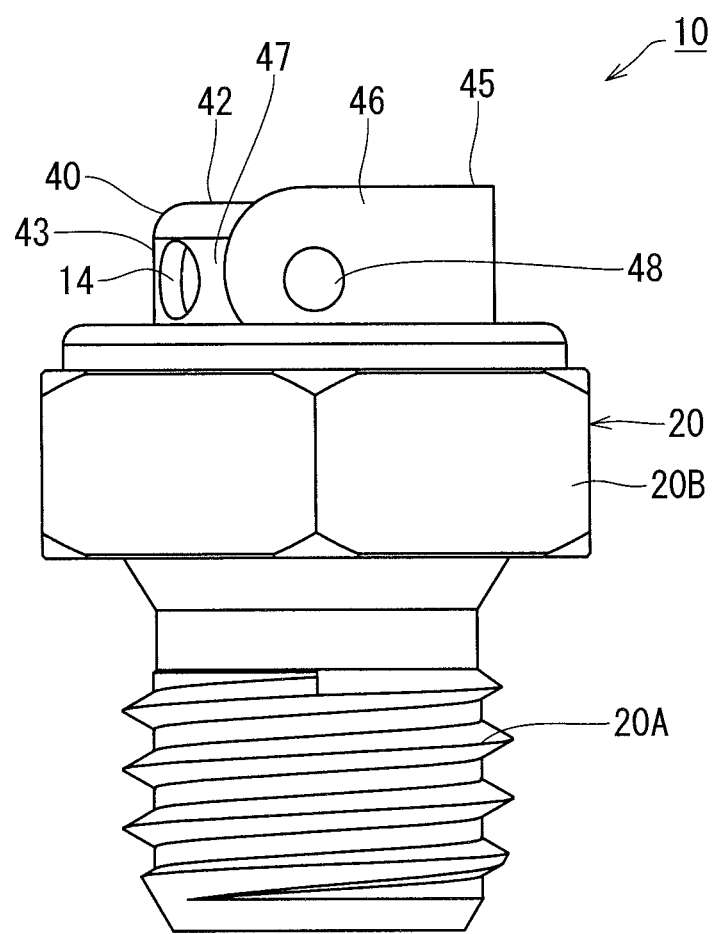
FIG. 3 is a side view of the relief valve.

A cover member 45 (which corresponds to a "direction change member" according to the present invention) is fitted in the outer side of the cylindrical portion 43 in the lid member 40. The cover member 45 is formed by curving a strip-shaped metal sheet into the shape of an arc, and covers about two-thirds of the outer circumferential surface of the cylindrical portion 43. A portion between both the end portions of the cover member 45 in the circumferential direction of the cylindrical portion 43 forms an opening open portion 47 according to the present invention, and about one-third of the circumferential surface of the cylindrical portion 43 is exposed to the outside through the opening open portion 47. Here, since the discharge holes 14 are arranged in the six positions which are equally spaced in the circumferential direction of the cylindrical portion 43 as described above, any one of the discharge holes 14 is brought into a fully opened state without fail even when the cover member 45 is arranged in an arbitrary rotation position around the cylindrical portion 43. As shown in FIG. 3, both the tip end portions of the cover member 45 are formed in the shape of an arc.

Figure 4:
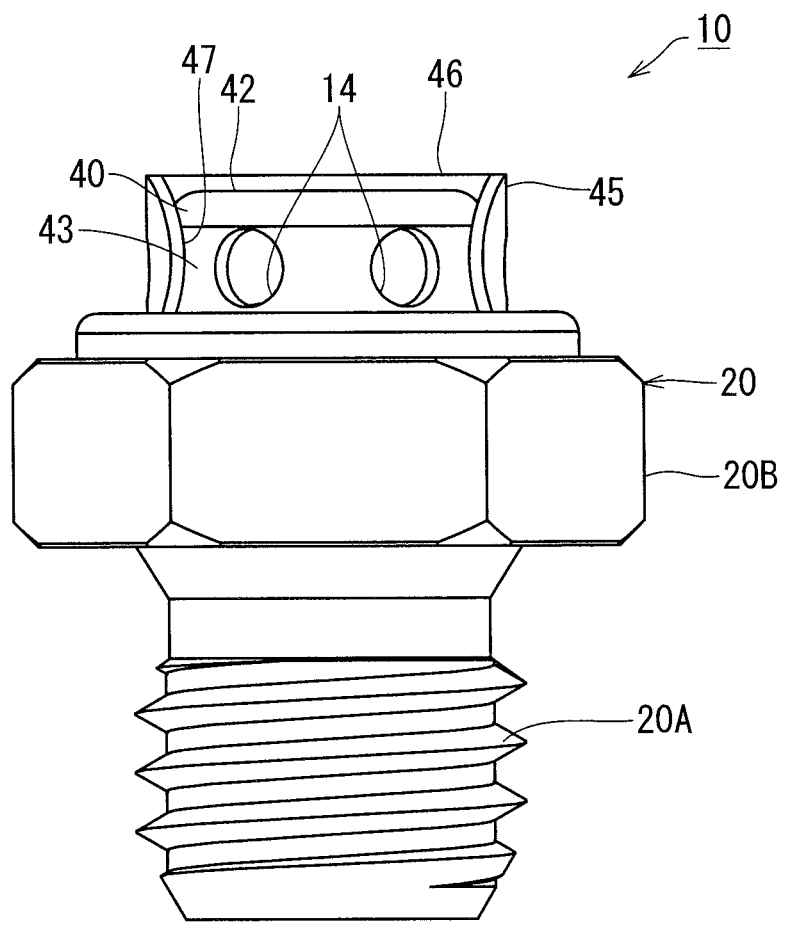
FIG. 4 is a front view of the relief valve.

A pair of locking protruding portions 48, 48 in a hemispherical shape protrude from positions close to both the ends of the cover member 45 to the side of the cylindrical portion 43. The pair of locking protruding portions 48, 48 are arranged opposed to each other across the center of the cylindrical portion 43, and are engaged, in a concave-convex manner, with two arbitrary discharge holes 14, 14 which are arranged opposed to each other in the cylindrical portion 43. As shown in FIGS. 2 and 4, when the locking protruding portions 48 are engaged, in a concave-convex manner, with the discharge holes 14 and thus the cover member 45 is positioned in the cylindrical portion 43, the two discharge holes 14, 14 are brought into an opened state.

Figure 5:
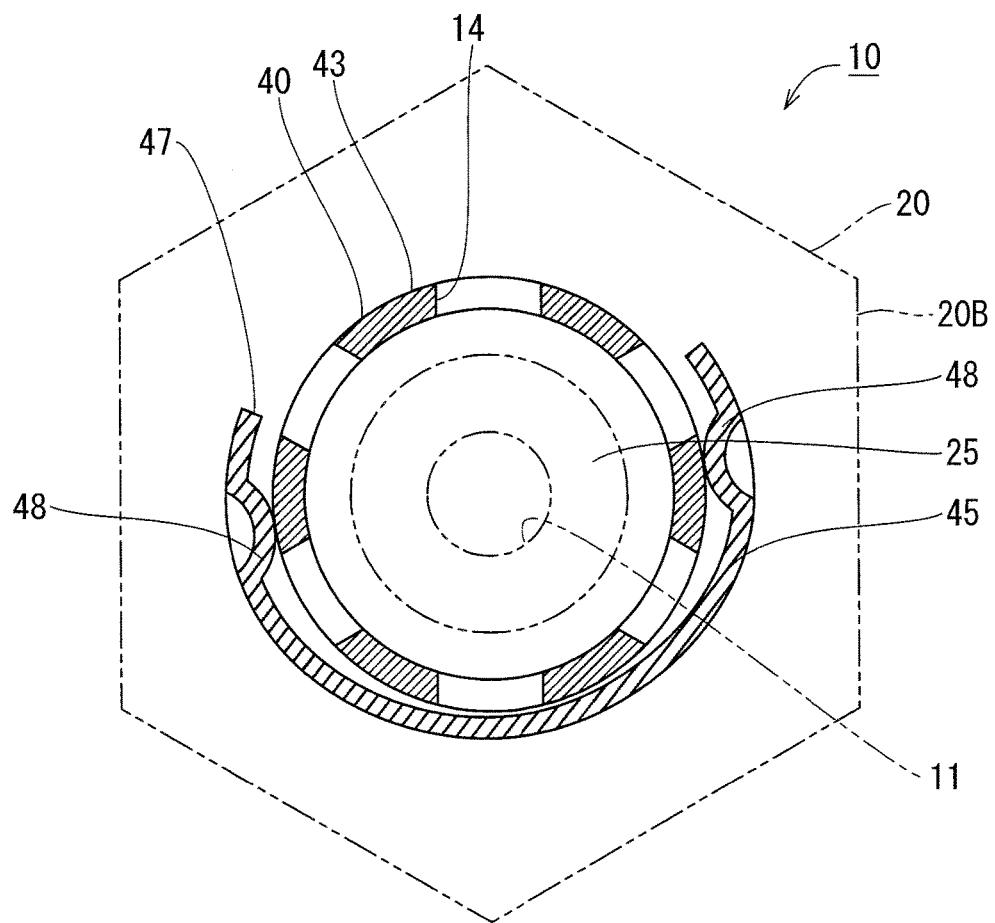
FIG. 5 is a plan cross-sectional view of the cover member and the lid member which are being rotated.

As shown in FIG. 1, the lower end portion of the cover member 45 is held in a gap 27S between the tip end surface of the swaged annular protruding wall 27 and the cylindrical portion 43, and the upper end portion of the cover member 45 protrudes upward from the upper surface of the lid member 40 and forms a cover member-operating protruding portion 46 according to the present invention. The cover member 45 is pushed and extended, from inside the cover member-operating protruding portion 46, with for example, an unillustrated tool in a range of the gap 27S so as to release the concave-convex engagement between the locking protruding portions 48 and the discharge holes 14, and thus the cover member 45 can be rotated to an arbitrary position. A rotation, force may simply be applied to the cover member 45 without the cover member 45 being extended by being pushed from inside. Then, as shown in FIG. 5, the locking protruding portions 48 ride on the opening edges of the discharge holes 14, and thus the concave-convex engagement is released, and accordingly, the cover member 45 can be rotated to an arbitrary position.

The configuration of the relief valve 10 of the present embodiment has been described above. Then, the effects of operation of the relief valve 10 will be described. As shown in FIG. 1, the relief valve 10 is used in a state where the relief valve 10 is fitted into a fluid discharge hole 91 of a fluid device 90 (for example, an air conditioner a boiler circuit or hydraulic pressure regulator in an engine lubrication system, etc.). When an internal pressure inside the fluid discharge hole 91 is equal to less than a predetermined reference value, the relief valve 10 is kept in a closed state while the internal pressure inside the fluid discharge hole 91 is higher than the reference value, the valve member 12 is separated from the valve seat 11Z, and thus the valve hole 11 is opened. Then, the fluid of the fluid device 90 flows into the hollow room 25 and is discharged to the outside from the discharge holes 14 on the base end side of the valve body 20. In a state where an O-ring 35 as a seal member is attached to the base end port of the male screw portion 20A, the relief valve 10 is screwed into a female screw portion 92 which is formed in the inner surface of the fluid discharge hole 91. In this way, it is possible to prevent the fluid from leaking from a gap between the valve body 20 and the fluid discharge hole 91.

Here, in the relief valve 10 of the present embodiment, a plurality of discharge holes 14 are arranged in a plurality of positions in the circumferential direction of the cylindrical portion 43 which protrudes from the end surface 20P of the head portion 20B. Since part of the plurality of discharge holes 14 is closed by the cover member 45 which is rotatably fitted in the cylindrical portion 43, and arbitrary discharge holes 14 are opened by the opening open portion 47 included in the cover member 45, the relief valve 10 is attached to the fluid device 90, and then the cover member 45 is arranged in an arbitrary rotation position, with the result that the arbitrary discharge holes 14 are opened and thus it is possible to direct the fluid discharge direction to a desired direction.

In this way, even when the relief valve 10 is arranged near a specific component which can be degraded by receiving the fluid, the fluid discharge direction is directed to a predetermined direction, and thus it is possible to prevent the fluid from being applied to the specific component. When the fluid device 90 is a car air conditioner, it is also possible to discharge the fluid to a place that is not noticeable to the driver. That is, in the relief valve 10 of the present embodiment, the loss of the flexibility of an attaching position caused by constraint conditions such as the prevention of the application of the fluid to the specific component is reduced. In other words, the flexibility of the attaching position is enhanced as compared with the conventional relief valve. Since any of the discharge holes 14 is constantly opened regardless of the rotation position of the cover member 45, when the fluid pressure received by the valve member 12 from the side of the valve hole 11 is equal to or more than a reference pressure, it is possible to reliably discharge the fluid. Moreover, since the locking protruding portions 48 which are locked into the discharge holes 14 are provided in the cover member 45, the rotation position of the cover member 45 with respect to the cylindrical portion 43 is stabilized, and the cover member 45 can be prevented from being separated from the cylindrical portion 43. Furthermore, since the cover member-operating protruding portion 46 protruding from the end surface of the cylindrical portion 43 is provided on the cover member 45, it is possible to easily perform an operation of rotating the cover member 45.

Second Embodiment

Figure 6:
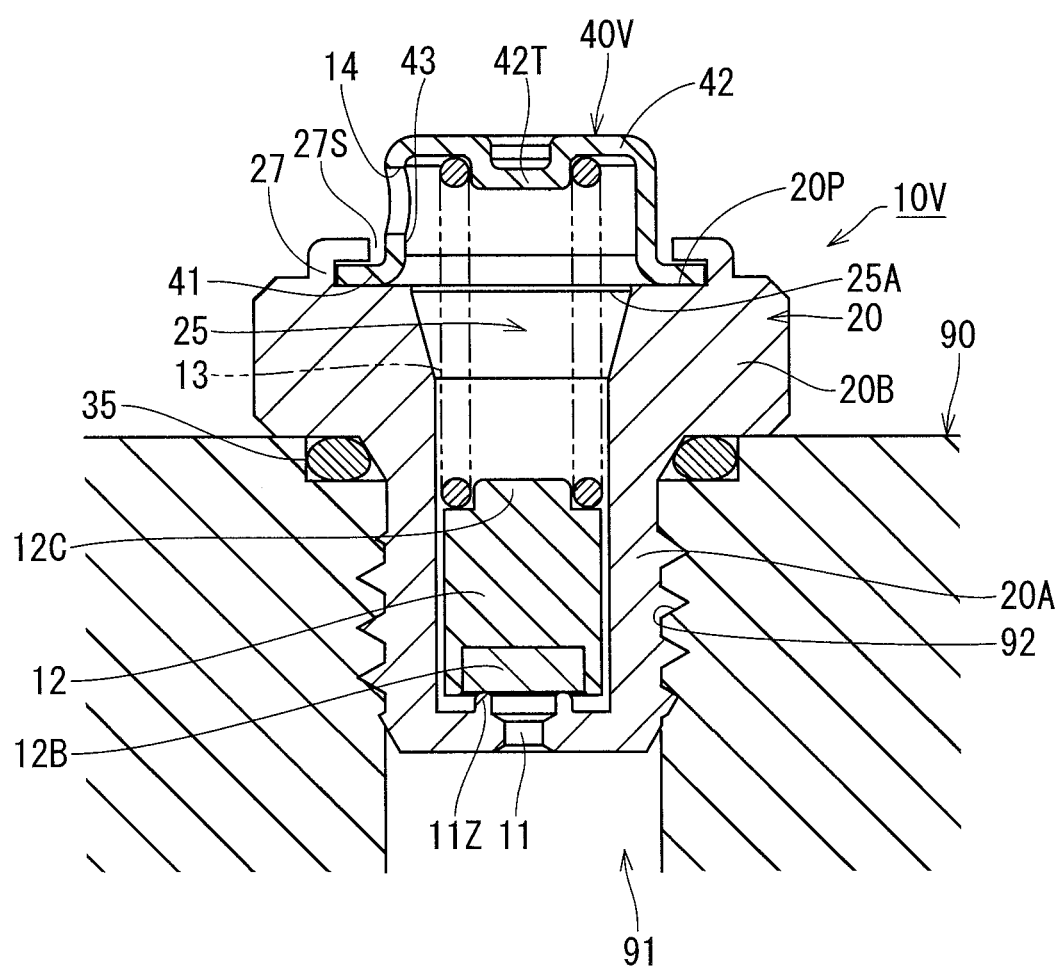
FIG. 6 is a front cross-sectional view of a relief valve according to a second embodiment.

A second embodiment of the present invention will be described below with reference to FIG. 6. The present embodiment greatly differs from the first embodiment in that the relief valve 10V of the present embodiment does not include the cover member 45 and that a lid member 40V can be rotated. Specifically, the lid member 40V of the present embodiment is the same as the lid member 40 of the first embodiment except that the lid member 40V of the present embodiment has only one discharge hole 14. The annular protruding wall 27 is swaged in a state where a clearance is provided between the annular protruding wall. 27 and the contacting flange 41 of the lid member 40V so that the lid member 40V can be rotated with respect to the valve body 20.

Even in the relief valve 10V of the present embodiment, the lid member 40V is rotated, and thus it is possible to change the fluid discharge direction to an arbitrary direction, with the result that the same effects of operation as in the first embodiment described above are achieved, and moreover, since the cover member 45 does not need to be provided, it is possible to reduce the number of components.

In the relief valve 10V of the present embodiment, the lid member 40V corresponds to the "direction change member" according to the present invention, and the annular protruding wall 27 and the contacting flange 41 correspond to the "rotation coupling portion" according to the present invention. The "cylindrical portion" according to the present invention does not need to be cylindrical, and may be formed in the shape of a square tube or an elliptical cylinder.

Other Embodiments

The present invention is not limited to the embodiments described above, for example, embodiments which will be described below are also included in the technical scope of the present invention and furthermore, in addition to the embodiments below, various variations can be practiced without departing from the spirit thereof.

Figure 7:
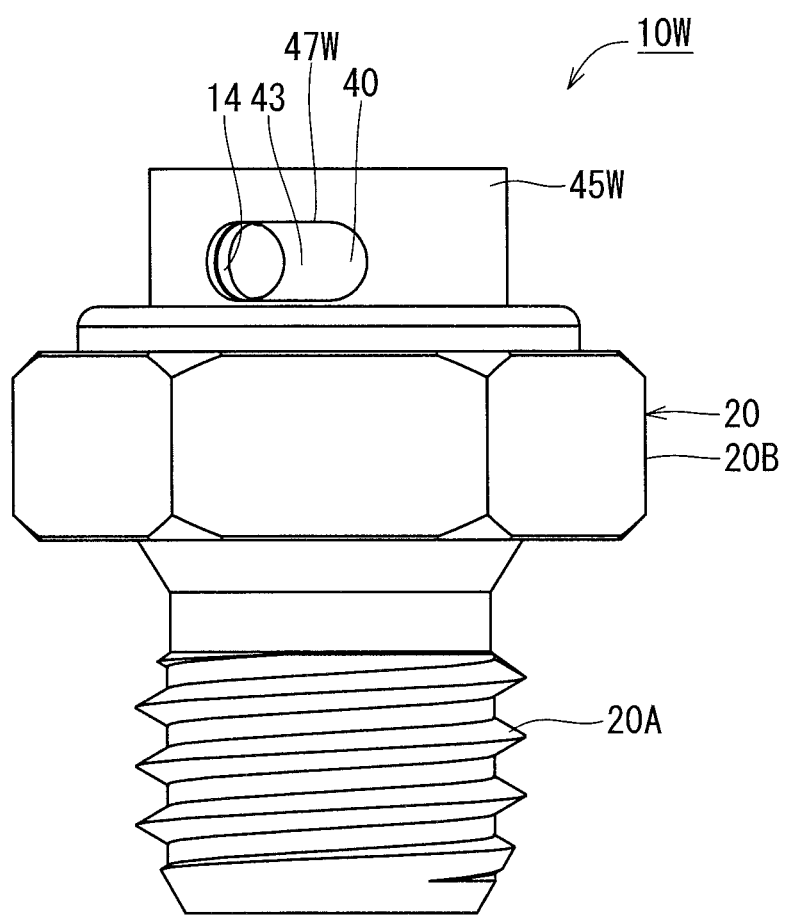
FIG. 7 is a front view of a lid member according to a variation.
Figure 8:
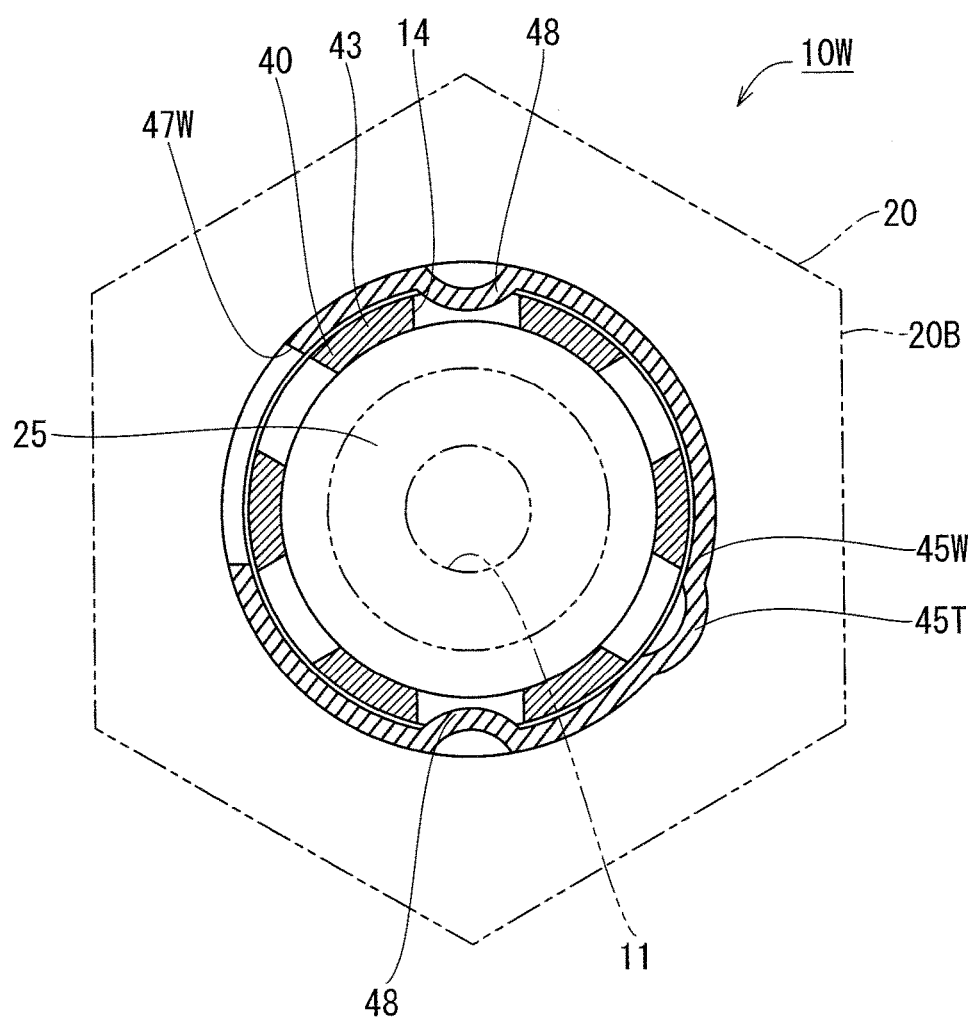
FIG. 8 is a plan cross-sectional view of a cover member and the lid member according to the variation.

(1) Although in the first embodiment described above, the cover member 45 is formed by curving the metal sheet and the portion between both the end portions thereof is the opening open portion 47, a configuration may be adopted in which as in a relief valve 10W shown in FIGS. 7 and 8, a cover member 45W is cylindrical, in which an open through hole 47W is provided in part of the cover member 45W in a circumferential direction, as the "opening open portion" according to the present invention and in which only one arbitrary discharge hole 14 overlaps the open through hole 47W.

Figure 9:
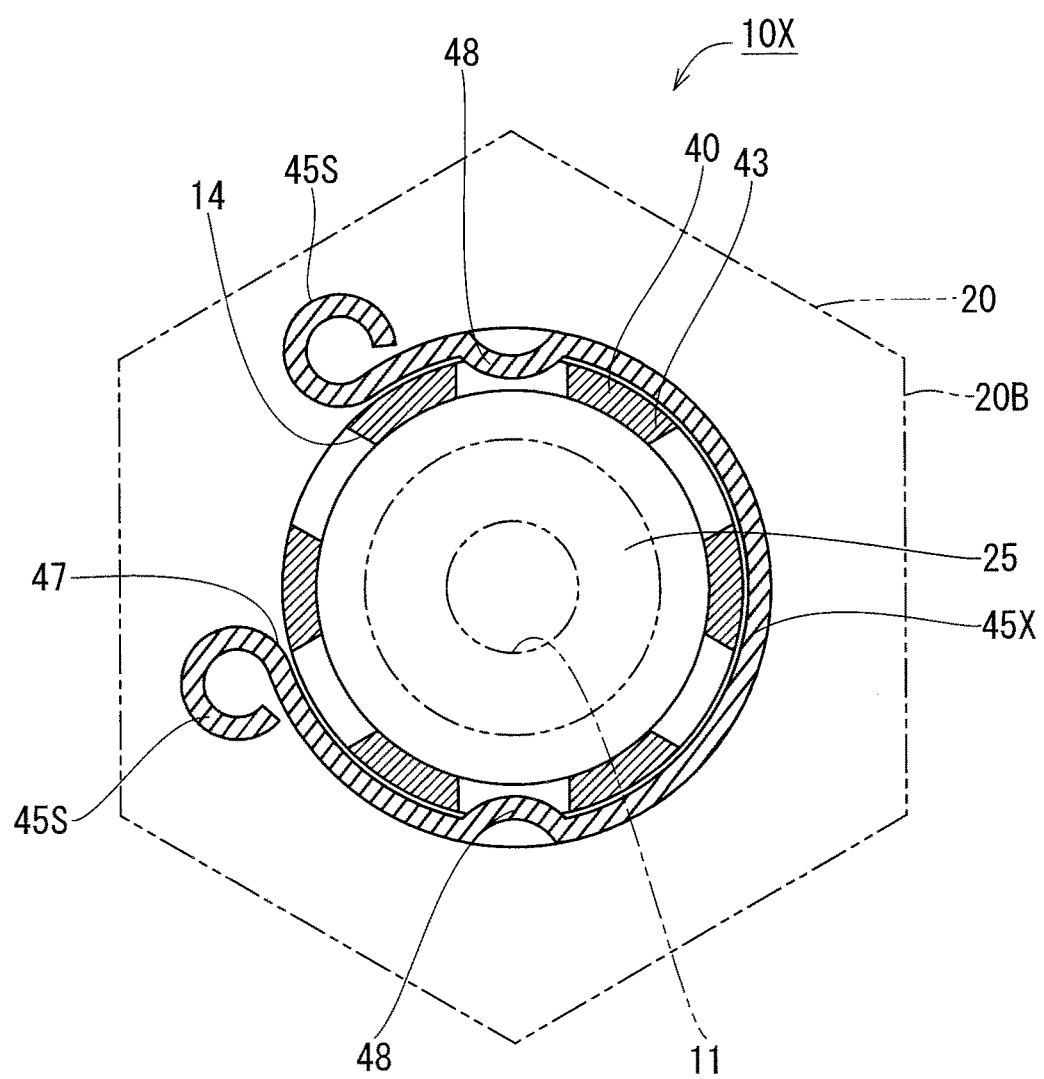
FIG. 9 is a plan cross-sectional view of the cover member and the lid member according to a variation.

(2) As in the relief valve 10W shown in FIG. 8, a protruding portion 45T which protrudes outward may be provided on the circumferential wall of the cover member 45W or as in a relief valve 10X shown in FIG. 9, operation portions 45S obtained by rounding both the end portions of a cover member 45X outward, may be provided. When the protruding portion 45T or the operation portions 45S are provided as described above, a finger is easily hooked so as to make it easy to perform an operation of rotating the cover member 45X.

(3) Although in the first embodiment described above, the lid member 40 is fixed to the valve body 20 by swaging of the annular protruding wall 27, the lid member 40 may be fixed with an adhesive or by welding.

DESCRIPTION OF THE REFERENCE NUMERAL

10, 10V, 10W, 10X Relief valve
11 Valve hole
12 Valve member
13 Compression coil spring (elastic member)
14 Discharge hole
20 Bolt-type valve body
20A Male screw portion
20B Head portion
20P End surface of head portion
25 Hollow room
25A Component insertion port
27 Annular protruding wall (rotation coupling portion)
40, 40V Lid member
41 Contacting flange (rotation coupling portion)
43 Cylindrical portion (Cylindrical portion)
45, 45W, 45X Cover member
45S Operation portion
45T Protruding portion
46 Cover member-operating protruding portion
47 Opening open portion
47W Open through hole (opening open portion)
48 Locking protruding portion

The invention claimed is:
1. A relief valve comprising: a bolt-type valve body; a hollow room which is formed in a center portion of the bolt-type valve body and which includes a component insertion port that is open to an end surface of a head portion of the bolt-type valve body; a lid member which closes the component insertion port; a valve hole which is open to a tip end surface of the bolt-type valve body and which communicates with the hollow room; a valve member which is accommodated in the hollow room and which opens and closes the valve hole; an elastic member which is accommodated in the hollow room and which biases the valve member to a side where the valve hole is closed; a cylindrical portion which is formed in the lid member and which protrudes from the end surface of the head portion; a plurality of discharge holes which is formed in a plurality of positions on a side surface of the cylindrical portion; and a direction change member which is rotatingly operated and which changes a direction in which at least one of the plurality of discharge holes is open to any desired direction, a locking protruding portion which is formed in the direction change member and which is locked into at least one of the plurality of discharge holes, wherein the direction change member includes a closed portion that closes at least another one of the plurality of discharge holes and an open portion that opens the at least one of the plurality of discharge holes.

2. The relief valve according to claim 1,
wherein the direction change member comprises a cover member which is rotatably fitted in an outer side of the cylindrical portion, and
wherein the open portion opens the at least one of the plurality of discharge holes according to a rotation position of the cover member.

3. The relief valve according to claim 2, comprising:
a cover member-operating protruding portion which is provided on the cover member and which protrudes from an end surface of the cylindrical portion.

4. The relief valve according to claim 2,
wherein the open portion has such a size as to reliably open at least part of the at least one of the plurality of discharge holes according to the rotation position of the cover member.

5. The relief valve according to claim 3,
wherein the open portion has such a size as to reliably open at least part of the at least one of the plurality of discharge holes according to the rotation position of the cover member.

* * * * *